UNITED STATES PATENT OFFICE.

GUSTAV LORENZ, OF DARMSTADT, GERMANY, ASSIGNOR TO THE ROTHLAUF SERUM GESELLSCHAFT MIT BESCHRÄNKTER HAFTUNG, OF BERLIN, GERMANY.

PROCESS OF PREPARING REMEDIAL SUBSTANCES FROM SWINE-BLOOD.

SPECIFICATION forming part of Letters Patent No. 645,110, dated March 13, 1900.

Application filed July 6, 1898. Serial No. 685,267. (No specimens.)

*To all whom it may concern:*

Be it known that I, GUSTAV LORENZ, a citizen of the Empire of Germany, residing at Darmstadt, in the Grand Duchy of Hesse, Empire of Germany, have invented certain new and useful improvements in processes for the production of a permanent preparation containing the white corpuscles of the blood-serum of swine immunized against swine fever, of which the following is a specification.

By a special treatment swine can be rendered immune against swine fever in the following manner:

Immune swine have in the serum of their blood matters which when inoculated in other swine are capable of causing the same to possess a passive immunity, as well as to effect a cure in cases in which the swine are already infected with swine fever. As the pure blood-serum, or even that mixed with small quantities of disinfecting substances, can hardly be widely applied in veterinary practice, because it is too liable to decomposition, while, on the other hand, it would render it too expensive to supply it in sterilized vessels and already divided into doses in the manner in which diphtheritic-serum antidote is prepared, I have directed my attention to the obtaining of a process for producing a preparation which shall possess the property of permanence and shall, moreover, have the advantage that it can always be brought to a particular percentage of active material, which, in view of its multiple applications, is of no small advantage.

The process discovered by me after considerable research and which provides the advantages above referred to is essentially as follows: From the fresh blood freed from its clot in the usual mechanical manner and containing the white blood-corpuscles the serum is obtained by immediate centrifugal separation. This serum is then purified from certain components which prevent the obtaining of the preparation in question. This purification is effected by adding first a small quantity of concentrated solution of chlorid of calcium, and then by the dissolving in the mixture of a quantity of sulphate of ammonia so proportioned that a certain amount of slimy substances, of fatty compounds, and albuminous substances are separated, but no white of corpuscles. After these bodies have been removed from the solution by filtering or simply by allowing them to coadhere the precipitation of the white corpuscles is effected from the same. This body will be precipitated upon the addition of a further definite quantity of sulphate of ammonia, in combination with a series of albuminous bodies, and can be obtained by filtering through paper or other suitable filtering apparatus, as the precipitate, and can be purified by washing or re-solution in water and repeated precipitation with sulphate of ammonia. After the substance thus obtained, which forms a white somewhat gray-green residue, has been dried upon earthen plates it is dissolved in a fluid compounded as follows: In twelve hundred parts of water ninety parts of salicylate of soda are dissolved and nine hundred parts of glycerin added to the solution. This fluid is kept for use and poured separately over the dry residue, after which there is added distilled water, five-per-cent. solution of carbonate of soda, and five-per cent. solution of carbolic acid in equal parts, and in such quantity that the whole compound will contain about five per cent. of carbolic acid and carbonate of soda respectively. After the soluble parts are all dissolved the still cloudy fluid is separated from the specifically heavy insoluble compounds in a centrifugal apparatus, which has not the usual opening which is provided for the removal of the specifically heavy parts, so that the said insoluble parts are deposited around the rim of the centrifugal drum as a kind of slime. The other insoluble substances consist of specifically lighter parts rising gradually to the top and forming here a white scum, while the fluid after a shorter or longer standing appears as a more or less clear solution which can be slowly let off by suitable devices below the layers which cause the cloudiness. After the solution has been tested for its content of white corpuscles by experiments on living animals the said solution can be made normal by the further addition of any of the above-mentioned fluids in the event that there is any deficiency in any of these in the original mixing.

Having now particularly described and ascertained the nature of my said invention and in what manner the same is to be performed, I declare that what I claim is—

1. The method of preparing a permanent preparation containing in determined proportions the white corpuscles of the blood of swine immuned against swine fever consisting in purifying the serum with a concentrated solution of chlorid of calcium, allowing the serum to stand a short time, then precipitating the same fractionally with sulphate of ammonia in such proportion that the first precipitate will include only the fatty compounds and albuminous substances, which interfere with the subsequent solution of the residue containing the white corpuscles, and then precipitating the white corpuscles by the further addition of sulphate of ammonia.

2. The method of preparing a permanent preparation containing in determined proportions the white corpuscles of the blood of swine immuned against swine fever consisting in purifying the serum with a concentrated solution of chlorid of calcium, allowing the serum to stand a short time, then precipitating the same fractionally with sulphate of ammonia in such proportions that the first precipitate will include only the fatty compounds and albuminous substances, which interfere with the subsequent solution of the residues containing the white corpuscles, and then precipitating the white corpuscles by the further addition of sulphate of ammonia, drying the precipitate containing the white corpuscles upon plates and then dissolving the same in a fluid composed of water, glycerin, salicylate of soda, carbonate of soda, and carbolic acid in the proportions substantially as described.

In witness whereof I have hereunto set my hand in presence of two witnesses.

GUSTAV LORENZ.

Witnesses:
PAUL SCHULZ,
ANTON LIPPERT.